(12) United States Patent
Moyer

(10) Patent No.: US 8,775,863 B2
(45) Date of Patent: Jul. 8, 2014

(54) CACHE LOCKING CONTROL

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 408 days.

(21) Appl. No.: 13/149,304

(22) Filed: May 31, 2011

(65) Prior Publication Data

US 2012/0311380 A1    Dec. 6, 2012

(51) Int. Cl.
*G06F 11/00* (2006.01)

(52) U.S. Cl.
USPC .............................. 714/6.1; 711/133

(58) Field of Classification Search
USPC ............................ 714/6.1; 711/133
See application file for complete search history.

(56) References Cited

U.S. PATENT DOCUMENTS

| 4,825,412 | A  | * | 4/1989  | Sager et al. ............. 365/189.06 |
| 4,996,641 | A  |   | 2/1991  | Talgam et al. |
| 5,353,425 | A  | * | 10/1994 | Malamy et al. .............. 711/144 |
| 6,918,071 | B2 |   | 7/2005  | Cherabuddi et al. |
| 7,228,386 | B2 | * | 6/2007  | Rowlands et al. ............ 711/128 |
| 7,380,180 | B2 | * | 5/2008  | Valine ........................... 714/718 |
| 7,827,360 | B2 | * | 11/2010 | Rahman et al. ............... 711/141 |
| 2002/0046326 | A1 | * | 4/2002 | Devereux ...................... 711/128 |
| 2007/0022250 | A1 | * | 1/2007 | Fields et al. ................... 711/133 |
| 2009/0307538 | A1 |   | 12/2009 | Hernandez et al. |
| 2010/0058109 | A1 | * | 3/2010 | Chang et al. ...................... 714/8 |
| 2011/0047334 | A1 |   | 2/2011 | Eichenberger et al. |

OTHER PUBLICATIONS

U.S. Appl. No. 13/149,217, filed May 31, 2011, entitled "Control of Interrupt Generation for Cache,".
Non-Final Office Action mailed Sep. 9, 2013 for U.S. Appl. No. 13/149,217, 20 pages.

* cited by examiner

*Primary Examiner* — Philip Guyton

(57) ABSTRACT

Each cache line of a cache has a lockout state that indicates whether an error has been detected for data accessed at the cache line, and also has a data validity state, which indicates whether the data stored at the cache line is representative of the current value of data stored at a corresponding memory location. The lockout state of a cache line is indicated by a set of one or more lockout bits associate with the cache line. In response to a cache invalidation event, the state of the lockout indicators for each cache line can be maintained so that locked out cache lines remain in the locked out state even after a cache invalidation. This allows memory error management software executing at the data processing device to robustly manage the state of the lockout indicators.

20 Claims, 4 Drawing Sheets

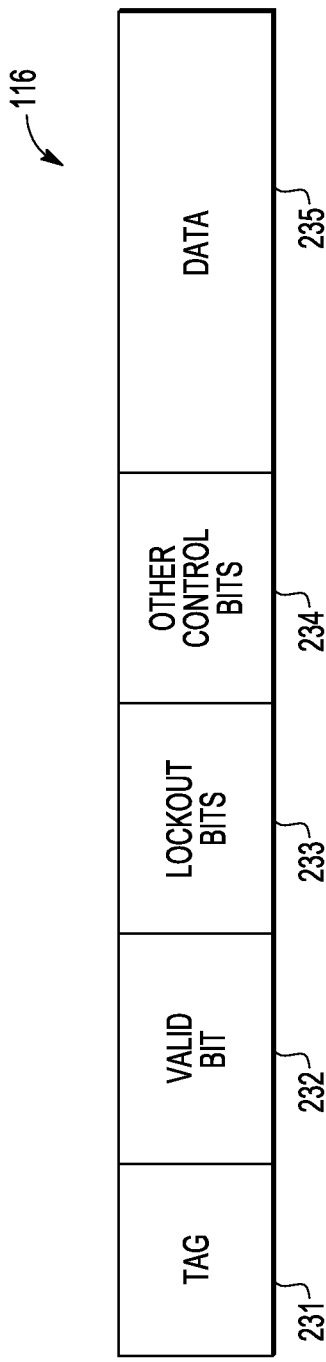
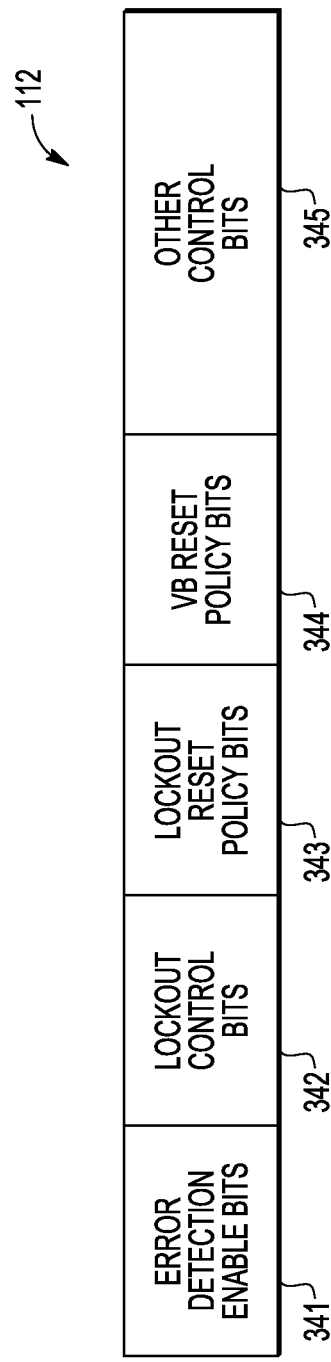

CACHE LOCKING CONTROL

CROSS-REFERENCE TO RELATED APPLICATION

The present application is related to U.S. patent application Ser. No. 13/149,217, entitled, "CONTROL OF INTERRUPT GENERATION FOR CACHE" filed on an even date herewith, the entirety of which is incorporated by reference herein.

FIELD OF THE DISCLOSURE

The present disclosure relates generally to data processing devices, and more particularly to caches for data processing devices.

BACKGROUND

A data processing device typically employs a cache for storage and retrieval of recently accessed information. However, information stored in the cache can be stored or retrieved in an erroneous state due to hard errors, resulting from a defective storage cell, or soft errors, such as errors resulting from alpha particle disruption or marginal operation of a storage cell. To protect against such errors, the data processing device can employ an error protection module that detects, and in some cases corrects, errors in information retrieved from the cache. In addition, the data processing device can employ a lockout scheme, whereby cache lines for which errors have been detected are rendered inaccessible.

BRIEF DESCRIPTION OF THE DRAWINGS

The present disclosure may be better understood, and its numerous features and advantages made apparent to those skilled in the art by referencing the accompanying drawings.

FIG. 2 is a diagram of a cache line of the cache of FIG. 1 in accordance with one embodiment of the present disclosure.

FIG. 3 is a diagram of the cache control register of FIG. 1 in accordance with one embodiment of the present disclosure.

DETAILED DESCRIPTION

Figure 1:
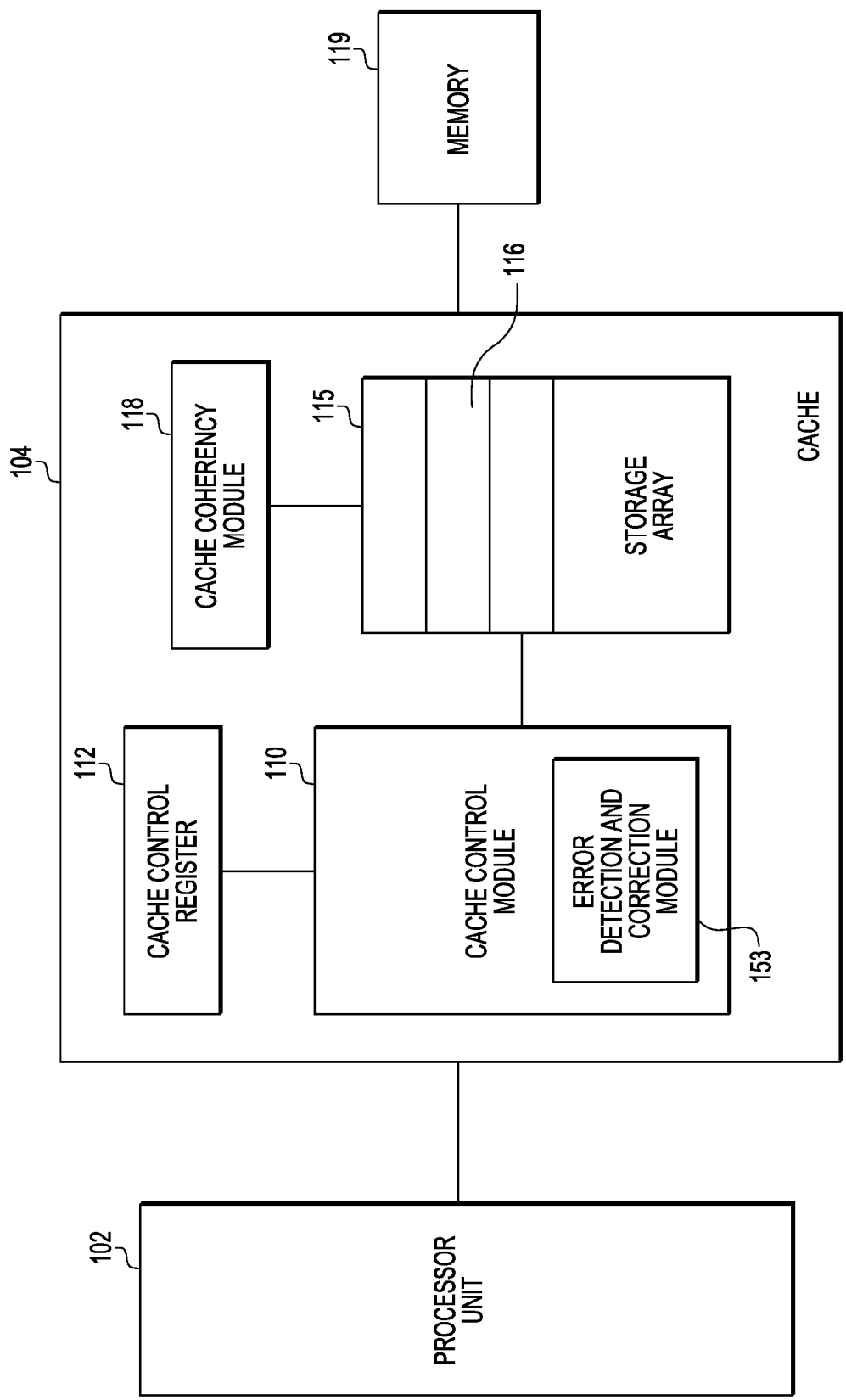
FIG. 1 is a block diagram illustrating a data processing device in accordance with a specific embodiment of the present disclosure.

FIGS. 1-5 illustrate example techniques for managing the lockout state for each cache line of a cache at a data processing device. Each cache line has a lockout state that indicates whether an error has been detected for data accessed at the cache line, and also has a data validity state, which indicates whether the data stored at the cache line is representative of the current value of data stored at a corresponding memory location. The lockout state of a cache line is indicated by a set of one or more lockout bits associate with the cache line. When a cache line is in a locked-out state, the cache line is not used by the cache. Accordingly, a locked-out cache line is not employed by the cache to satisfy a cache accesses, and is not used to store data retrieved from memory in response to a cache miss. In response to determining the detected error likely did not result from a hardware failure or other persistent condition, memory error management software can reset the lockout state of the cache line (so that the cache line can be used by the cache).

The data validity state of the cache line is indicated by a valid bit. When the valid bit is set, the cache line is a valid cache line and the data stored at the cache line can be used to satisfy a cache access. When the valid bit for a cache line is in a reset state, the cache line is invalid and data stored at the cache line is not used to satisfy a cache access. However, in contrast to a locked-out cache line, an invalid cache is available to store data retrieved from memory in response to a cache miss. Upon storage of the retrieved data, the valid bit for the cache line is set to indicate that valid data is stored at the cache line.

In the course of operation, the data processing device will experience cache invalidation events, whereby each cache line is set to an invalid state. For example, a cache invalidation event can be a reset event that resets the operations of the data processing device. The cache invalidation event can also be the result of an explicit instruction. In response to a cache invalidation event, the valid indicators for each cache line are reset to indicate that each cache line is invalid. However, based on a programmable lockout reset policy, the state of the lockout indicators for each cache line can be maintained in response to the cache invalidation event so that locked out cache lines remain in the locked out state even after a cache invalidation. This allows memory error management software executing at the data processing device to robustly manage the state of the lockout indicators.

To illustrate, in some systems the memory error management software is configured to detect hardware failures and other persistent failures at the cache by periodically polling the lockout indicators at designated intervals to determine which accessed cache lines have resulted in detected errors. The memory error management software logs the cache lines for which errors have been detected (as indicated by the lockout indicators for those cache lines being in the locked-out state) and then clears the lockout indicators. If a cache line is logged as having a detected error over a threshold number of polling intervals, the memory error management software determines that the cache line is associated with a hardware failure, and permanently locks out the cache line. However, in conventional systems the lockout indicators can be reset in response to a cache invalidation event, which can cause error management software to inaccurately determine whether a particular cache line is associated with a hardware failure. For example, the polling intervals for determining the severity or frequency of a particular error(s) may be spread out over multiple operational intervals of the data processor, such that each operating interval may have a cache invalidation event occurring prior to the next operating interval. By maintaining the current state of the lockout indicators in response to a cache invalidation event, the memory error management software is able to more accurately determine which cache lines are associated with hardware failures, and may flexibly set the polling interval as desired, regardless of intervening reset events. In contrast, the valid bits of a cache are typically reset for each cache invalidation event, since there is not a guarantee that the cache contains data which is coherent with other modules of the device when resuming operation after the cache invalidation event.

As used herein, a cache invalidation event is any event at a data processing device that results in all or substantially all of the cache lines of a cache being placed in an invalid state, wherein the cache lines will not be used to satisfy a cache access. In an embodiment, the cache invalidation event can be triggered by an explicit cache invalidation instruction executed at the data processing device. In another embodiment, the cache invalidation event is a reset event, wherein the cache is automatically invalidated in response to the data processing device being reset.

In an embodiment, the data processing device determines whether to reset or maintain the state of the lockbits in response to the cache invalidation event based on a programmable lockout reset policy. This allows the memory error management software to flexibly control whether lockbits are reset according to the particular needs of the memory error management software. The lockout reset policy is indicated by a programmable cache control register that is accessed by a cache control module in response to a reset event. Based on the lockout reset policy, the cache control module can selectively reset or maintain lockout bits in their pre-reset state when a reset event occurs.

FIG. 1 illustrates a data processing device 100 in accordance with one embodiment of the present disclosure. In the embodiment illustrated at FIG. 1, the data processing device 100 is a general purpose data processing device that can be incorporated into an electronic device, such as a portable electronic device, computer devices, automotive device, and the like. The data processing device 100 is generally configured to decode a set of instructions into one or more operations, and execute the operations in order to perform tasks associated with the electronic system. For example, the data processing device 100 can be incorporated in a mobile telephone device, and execute sets of instructions to send and receive phone calls, access the Internet, send and receive text messages, and the like.

Referring again to FIG. 1, the data processing device 100 includes a processor unit 102 connected, via a bus or interconnect, to a cache 104. It will be appreciated that the data processing device 100 can also included additional modules not illustrated at FIG. 1, including additional caches, system memory, interconnects, input/output interfaces, and the like.

The processor unit 102 is a module configured to decode processor instructions into one or more operations and execute the operations in order to perform the functions of the data processing device 100. The For example, in one embodiment the data processing device 100 is part of an automobile control system, and the processor unit 102 executes operations to control aspects of the automobile's functions, such as detection of automobile conditions, management and control of different automotive features, and the like. The processor unit 102 can include one or more processor cores to execute operations.

An example operation that can be executed by the processor unit 102 is referred to as a memory access, whereby the processor unit 102 provides data to be transferred to a memory device (a write access) or requests data to be transferred from the memory device to the unit (a read access). The cache 104 is configured to store and retrieve data in response to write accesses and read accesses, respectively. To illustrate, in response to an access, the cache 104 decodes address information associated with the access and determines whether it currently contains valid information associated with the address information. If so, the cache 104 performs the operation designated by the access, such as modifying stored data (in the case of a write access) or providing the stored data to the processor unit 102 (in the case of a read access). In the event that the cache 104 does not store information associated with the address information, it can retrieve the information from other caches (not shown) or system memory 119 in response to the access.

The cache 104 includes a cache control module 110, a cache control register 112, a storage array 115, and a cache coherency module 118. The storage array 115 is a set of storage locations, referred to as cache lines, that store and provide information for the cache 104 in response to write and read accesses. An example cache line 116 is illustrated in FIG. 2. In the illustrated embodiment, the cache line 116 includes a tag field 231, a valid bit 232, lockout bits 233, other control bits 234, and data 235. The tag field 231 indicates the tag value that identifies the data stored at the cache line 225. The tag value is based on the memory address associated with the data. The data 235 stores the data associated with the memory location indicated by the tag field 231. In an embodiment, the data 235 includes 4 double words of data.

The state of the valid bit 232 indicates whether the cache line 116 stores valid data or invalid data. Cache lines storing invalid data are not used to satisfy processor accesses, and are given higher priority for replacement than cache lines storing valid data. In an embodiment, the valid bit 232 is set to the invalid state in response to a reset event at the data processing device 100, and is set to the valid state when a cache line is allocated and filled in response to a cacheable cache miss. In an embodiment, the valid bit 232 may be later cleared to the invalid state in response to the cache 104 receiving memory coherency information indicating that the data associated with the cache line 116 has been modified at another cache or at system memory 119.

The state of the lockout bits 233 indicate whether the cache line 116 is in a locked-out state. As described further herein, the cache 104 is configured so that cache lines in the locked-out state are prevented from resulting in cache hits or from being used for cache line allocations on a cache miss. In other words, the cache 104 will not indicate, based on a cache line in a locked-out state, that the cache line stores data associated with an access, even if the tag field for the cache line would otherwise result in a cache hit. In an embodiment, the lockout bits 233 includes a set of redundant bits, whereby the redundant bits are each set to the same state in order to indicate the locked-out state of the cache line 116. By employing redundant bits, the lockout bits 233 are more robust and resistant to hard or soft errors and the possible indication of an incorrect lockout state for the cache line 116.

The other control bits 234 store other control information for the cache line 116, such as additional coherency bits, protection bits, security information, ECC codes, and the like. In an embodiment, the cache 100 is an N-way set associative cache, where N is an integer, and different ways of the cache can store different types of control information at the control bits 234. For example, in one embodiment the first way of a cache set can store a replacement flag in the additional control bits to indicate whether the cache set is eligible for replacement. The replacement flag is not stored at the other control bits of the other ways in the cache set.

Returning to FIG. 1, the cache control module 110 is configured to control access to the cache 104. In particular, the cache control module 110 receives address information associated with read and write accesses, decodes the address information to determine a tag, and determines based on the tag whether a non-locked out cache line of the cache 104 stores valid data associated with the address. If so, the cache control module 110 determines a cache hit and satisfies the access at the cache 104 by modifying the data (in the case of a write access) or providing the data to the processor unit 102 (in the case of a read access). If the cache 104 does not store valid data associated with the address at a non-locked out cache line, the cache control module 110 determines a cache miss and requests that the data associated with the address be retrieved from another cache or system memory for storage at the cache 104.

The cache control module 110 can also perform error detection and error correction operations for accesses to the cache. For example, for each write access to a cache line, the cache control module 110 can determine a set of ECC checkbits based on the data to be stored at the cache line and store the set of checkbits at the cache line. For each read access that results in a cache hit, the cache control module 110 can retrieve the set of ECC checkbits for the cache line and perform, at error detection and correction module 153, error detection and (if necessary) error correction on the data stored at the cache line.

The cache control module 110 can also determine, in response to detecting an error, that the detected error is uncorrectable. In response, the cache control module 110 can set the state of the lockout bits for the cache line to place the cache line in a locked-out state. The cache control module 110 can also modify the state of the lockout bits for a cache line based on instructions executing at the processor unit 102. This allows memory error management software executing at the processor unit 102 to manage the locked-out state of each cache line.

For a cacheable access resulting in a cache miss, the cache 104 receives data associated with the access from another cache or system memory. The cache control module 110 determines, based on a cache replacement policy, at which cache line of the cache 104 the received data is to be stored. In an embodiment, the cache control module 110 implements a cache replacement policy such that cache lines storing invalid data (as indicated by the valid bit for the cache line) are replaced before cache lines storing valid data. If all cache lines store valid data, the cache control module 110 replaces cache lines according to a least-recently-used policy.

In addition, the cache control module 110 can manage the state of each cache line in response to a cache invalidation event, such as a cache invalidation instruction, a hard reset, or a soft reset of the data processing device 100. To illustrate, in response to a cache invalidation event the cache can set the valid bit for each cache line to an invalid state, so that no line will satisfy an access request until one or more lines is later filled and validated. In addition, the cache control module 110 can implement a lockout bit reset policy that determines whether the lockout bits for each cache line are reset (to indicate that each cache line is in a non-lockout state) or maintained in the state the bits had when the cache invalidation event was indicated.

The operations of the cache control module 110 can be controlled by programming the cache control register 112, a particular embodiment of which is illustrated at FIG. 3. In the illustrated embodiment, the cache control register 112 stores error detection enable bits 341, lockout control bits 342, lockout policy reset bits 343, valid bit reset policy bits 344, and other control bits 345. The error detection enable bits 341 indicate whether error detection and correction is enabled at the cache 104. If error detection is enabled, the cache control module 110 will perform error detection and (if necessary) error correction for each access to the cache.

The lockout control bits 342 control how the cache 104 responds to errors detected in response to accesses. In an embodiment, the lockout control bits 342 can indicate whether cache line lockout is enabled or disabled. If cache line lockout is enabled, a cache line can be placed in a locked out state in response to detecting selected errors in the data stored at the cache line. In an embodiment, the selected errors can be a) all errors, b) only uncorrectable errors, or c) other selected error types. In addition, the lockout control bits 342 can indicate a machine check policy that determines whether a machine check is generated in response to detecting certain types of errors at a cache line. In an embodiment, the lockout control bits can indicate one of three different policies. According to a first policy, a machine check is not generated for any detected errors. According to a second policy, a machine check is generated if any error is detected. According to a third policy, a machine check is generated only if an error is detected at the cache line and the cache line is actually locked out.

The lockout reset policy bits 343 indicate the lockout bits reset policy for the cache 104. If the lockout reset policy is a first policy, referred to as an invalidate policy, the lockout bits for each cache line are reset to indicate a non-locked-out state in response to a cache invalidation event at the data processor device 102. If the lockout reset policy is a second policy, referred to as a protect policy, the lockout bits for each cache line are not reset to indicate a non-locked-out state in response to the reset event. In an embodiment, the cache control module 110, in response to a cache invalidation event, can reset the lockout reset policy bits 343 to an initial state. For example, in one embodiment the lockout reset policy bits are reset to the protect policy after a cache invalidation event. Accordingly, in this embodiment, the lockout reset policy defaults to the protect policy after each subsequent cache invalidation event to ensure that the lockout state for each cache line is not inadvertently changed in response to successive reset events. This embodiment may be useful for certain types of memory error management software algorithms. In an alternate embodiment, the lockout reset policy bits are unaffected by a cache invalidation event, and remain valid across cache invalidation events. Accordingly, in this embodiment, the lockout reset policy can be set by software, and remain in effect until later modified by software. This embodiment may also be useful for other types of memory error management software algorithms.

The valid bit (VB) reset policy bits 344 indicate the valid bit reset policy for the cache 104. If the VB reset policy is a first policy, referred to as an invalidate policy, in response to a cache invalidation event at the data processor device 102 the valid bit for each cache line is reset to indicate invalid data is stored at each cache line. If the VB reset policy is a second policy, referred to as a protect policy, the valid bit for each cache line is not reset to indicate an invalid state in response to the cache invalidation event. In an embodiment, the cache control module 110, in response to a reset event, can reset the VB reset policy bits 344 to an initial state. For example, in one embodiment the VB reset policy bits 344 are reset to the protect policy after a reset.

The other control bits 345 are employed to control other aspects of the operation of the cache 104. For example, in one embodiment the other control bits 345 can control whether the cache 104 is enabled or disabled. In the disabled state, the cache 104 will not respond to accesses, or will indicate all accesses as cache misses.

Referring again to FIG. 1, the cache coherency module 118 receives cache probes and other coherency accesses from other caches and system memory of the processor unit 102. A cache probe requests coherency information from a cache line designated by the probe. For example, the cache probe can request whether the cache 104 stores data associated with a particular memory address and, if so, whether that data is indicated as valid, exclusive, or in some other coherency state. Other coherency accesses can indicate that data associated with a memory address has been modified at another cache or at system memory. In response, the cache control module 110 can modify the valid bit for a cache line associated with the memory address to indicate that data stored at the cache line is invalid.

Figure 4:
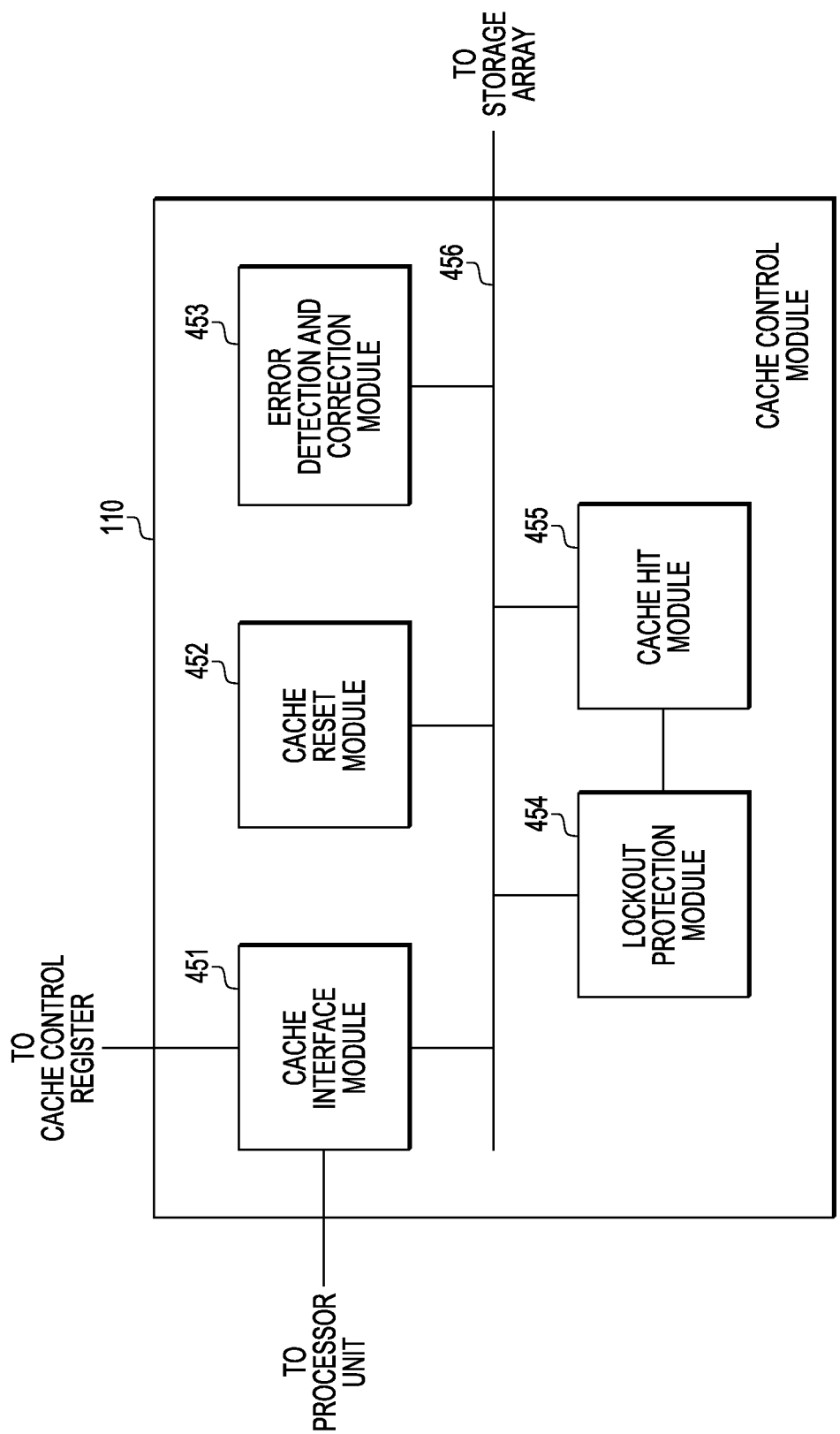
FIG. 4 is a block diagram of the cache control module of FIG. 1 in accordance with one embodiment of the present disclosure.

Referring to FIG. 4, a particular embodiment of the cache control module 110 is illustrated. The cache control module includes a cache interface module 451, a cache reset module 452, an error detection and correction module 453, a lockout protection module 454, a cache hit module 455, each connected to a bus 456. The bus 456 represents a communication medium that allows the modules of the cache control module 110 to communicate with each other and with the storage array 115. Accordingly, the bus 456 can be a serial or parallel bus, a set of point-to-point connections between modules, an interconnect, or other communication medium.

The cache interface module 451 provides an interface between the cache 104 and the processor unit 102. Accordingly, the cache interface module 451 receives accesses from the processor unit 102 and controls the operation of the other modules of the cache control module 110 in response to each access. To illustrate, in response to an access, the cache interface module 451 decodes address information associated with the access to determine a tag. The cache interface module 451 provides the tag to cache hit module 455.

The cache hit module 455 receives each tag and determines whether the storage array 116 includes a valid cache line associated with the tag. If not, the cache hit module 455 indicates a cache miss to the cache interface module 451. If there is a valid cache line associated with the tag, the cache hit module 455 prepares to indicate a cache hit. In response, the cache interface module 451 determines whether the lockout policy for the cache 104, as indicated at the cache control register 112, indicates that lockout protection is enabled for the cache 104. If lockout is not enabled, the cache interface module 451 commands cache hit module 455 to route all cache hits to directly to the cache interface module. If lockout protection is enabled, the cache interface module 451 commands the cache hit module 455 to route an indicated cache hit(s) to the lockout protection module 454.

The lockout protection module 454 determines, for each cache line that indicated the hit, whether the lockout bits associated with the cache line are in the locked-out state. If not, the lockout protection module 454 indicates a cache hit to the cache interface module 451. If the lockout bits are in the locked-out state for a cache line with an indicated hit, the lockout protection module indicates a cache miss to the cache interface module 451 for that line. In normal operation, only a single non-locked-out line is allowed to generate a cache hit. Locked-out cache lines can include tags that would otherwise result in a cache hit, but locked out cache lines are prevented from satisfying access requests.

In response to a cache hit, the cache interface module 451 executes the access at the indicated cache line. Accordingly, for write accesses, the cache interface module stores data associated with the access at the cache line that resulted in the cache hit. For read accesses, the cache interface module 451 determines whether error detection is enabled for the cache 104. If not, the cache interface module 451 retrieves the data requested by the read access from the storage array 116 and provides it to the processor unit 102. If error detection is enabled, the cache interface module 451 retrieves the data and provides it to the error detection and correction module 453.

The error detection and correction module 453 performs error detection on the retrieved data and, if an error is detected, determines if it can correct the error. For example, in an embodiment the error detection and correction module 453 can correct only single-bit errors. For those errors that can be corrected, the error detection and correction module 453 corrects the errors. Corrected data, or data for which no errors are detected, is provided to the cache interface module 451 for transfer to the processor unit 102. For uncorrectable errors, the error detection and correction module 453 notifies the cache interface module 451, which can lockout the cache line associated with the error, and also generate an exception in response to the error, based on the lockout control bits 342 (FIG. 3).

The cache reset module 452 is configured to reset the state of the valid bits and the lockout bits at the storage array 115 depending on the lockout reset policy bits and VB reset policy bits stored at the cache control register 112. In particular, in response to an indication of a cache invalidation event at the processor unit 102, the cache reset module 452 determines if the VB reset policy is the invalidate policy or the protect policy. If the policy is the invalidate policy, the cache reset module 452 modifies the state of each valid bit at the storage array 115 to indicate that the corresponding cache lines are invalid. If the policy is the protect policy, the cache reset module 452 maintains the state of each valid bit by not modifying the bits.

Similarly, in response to an indication of a cache invalidation event at the processor unit 102, the cache reset module 452 determines if the lockout reset policy is the invalidate policy or the protect policy. If the policy is the invalidate policy, the cache reset module 452 modifies the state of each lockout bit at the storage array 115 to indicate that the corresponding cache lines are not in the locked-out state. If the policy is the protect policy, the cache reset module 452 maintains the state of each lockout bit by not modifying the bits.

Figure 5:
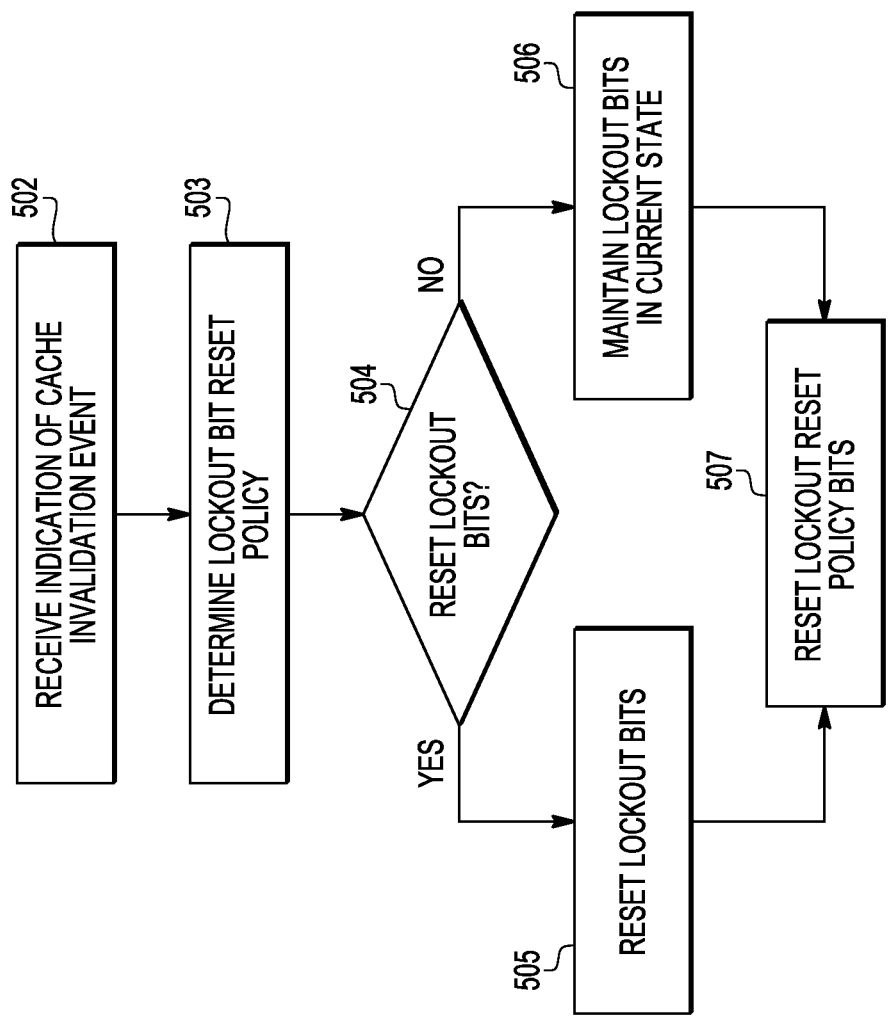
FIG. 5 is a flow diagram of a method of managing lockbits at the data processing device of FIG. 1 in accordance with one embodiment of the present disclosure.

FIG. 5 illustrates a flow chart of a method of controlling the state of lockout bits at the data processing device 100 in accordance with one embodiment of the present disclosure. At block 502, the processor unit 102 receives an indication of a cache invalidation event. The cache invalidation event can be, for example, a power being turned on at the processor unit 102, a soft reset requested by an operating system, other software, or a user actuating a reset button or sequence, and the like. In response to the reset event, the processor unit 102 can execute a reset sequence, including execution of BIOS code or other firmware code, and the like.

The cache invalidation event can also be execution of one of a set of designated cache invalidation instructions. In one embodiment, the set of cache invalidation instructions includes an explicit cache invalidation instruction, such that the sole or primary purpose of the instruction is to invalidate the cache. The set of cache invalidation instructions can also include one or more instructions that each result in execution of a number of operations, wherein cache invalidation is one of the operations triggered by the instruction.

At block 503, the processor unit 102 indicates the cache invalidation event to the cache 104. In response, the cache control module 110 accesses the cache control register 112 to determine the lockout bit reset policy, as indicated by the lockout bit reset policy bits 343. At block 504, the cache control module 110 determines if the lockout bit reset policy is the protect policy or the invalidate policy. If the policy is the invalidate policy, the method flow proceeds to block 505 and the cache control module 110 resets each of the lockout bits at the storage array 115 to a reset state. In an embodiment, the reset state indicates that the corresponding cache line is not locked out. The method flow proceeds to block 507 and the cache control module 110 resets the lockout reset policy bits to a reset state. In an embodiment, the reset state for the lockout reset policy bits is the invalidate state.

Returning to block 504, if the cache control module 110 determines that the lockout policy is the protect state, the method flow proceeds to block 506 and the cache control module 110 maintains the lockout bits in the state that each bit had when the indication of the reset event was received. The method flow proceeds to block 507 and the cache control module 110 resets the lockout reset policy bits to the reset state.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed.

As used herein, the term "first" can refer to any selected item, and does not necessarily refer to first in time or first in a particular order. Further, a lockout of a cache line refers to placing the cache line in a state whereby the cache line is not used to satisfy a cache access, and a non-locked out cache line refers to a cache line that is able to be used to satisfy the cache access.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. In a data processing device comprising a processor unit coupled to a cache comprising a plurality of cache lines, a method comprising:
   setting a lockout indicator in response to detecting an error at data stored at a first cache line of the plurality of cache lines;
   determining a lockout policy based on stored information;
   in response to determining the lockout policy is a first policy, maintaining the lockout indicator for the first cache line in the first state in response to a cache invalidation event; and
   in response to determining the lockout policy is a second policy, setting the lockout indicator for the first cache line to a second state in response to the cache invalidation event.

2. The method of claim 1, wherein the first cache line is not employed to satisfy cache accesses when the lockout indicator is in the first state.

3. The method of claim 2, wherein the first cache line is employed to satisfy cache accesses when the lockout indicator is in the second state.

4. The method of claim 1, wherein the cache invalidation event comprises execution of an instruction to invalidate the cache at the processor unit.

5. The method of claim 1, wherein the cache invalidation event comprises a reset event at the processor unit.

6. The method of claim 1, further comprising:
   when the lockout policy is the first policy, setting the lockout indicator for the first cache line to the second state in response to a software request, wherein the first cache line is employed to satisfy cache accesses when the lockout indicator is in the second state.

7. The method of claim 1, wherein detecting the error comprises detecting the error based on a set of ECC checkbits associated with data stored at the first cache line.

8. The method of claim 1, further comprising determining the lockout policy based on information stored at a register.

9. The method of claim 8, further comprising maintaining the information stored at the register in response to the cache invalidation event when the information stored at the register indicates the lockout policy is the first policy.

10. A method, comprising:
    in response to an indication of a cache invalidation event at a data processing device, determining a lockout reset policy for a cache based on stored information;
    in response to determining the lockout reset policy is a first policy, placing a plurality of lockout indicators in a reset state;
    in response to determining the lockout reset policy is a second policy, maintaining the plurality of lockout indicators in a current state; and
    preventing indication of a cache hit at a cache line based on a first lockout indicator of the plurality of lockout indicators.

11. The method of claim 10, comprising resetting the lockout policy to a reset state in response to the indication of the cache invalidation event.

12. The method of claim 11, wherein the reset state of the lockout policy indicates the second policy.

13. The method of claim 10, further comprising setting the first lockout indicator to a locked-out state in response to detecting an error at data stored at a cache line associated with the first lockout indicator, the cache prevented from indicating a cache hit at the cache line when the first lockout indicator is in the locked-out state.

14. The method of claim 10, further comprising determining the lockout policy based on information stored at a register.

15. A device, comprising:
    a processor unit;
    a cache comprising a plurality of cache lines; and
    a cache control module that sets a lockout indicator in response to detecting an error at data stored at a first cache line of the plurality of cache lines, wherein the lockout module includes a cache reset module that:
       in response to determining a lockout policy is a first policy, maintains the lockout indicator for the first cache line in the first state in response to a cache invalidation event, determining the lockout policy based on stored information; and
       in response to determining the lockout policy is a second policy, sets the lockout indicator for the first cache line to a second state in response to the cache invalidation event.

16. The device of claim 15, wherein the cache control module does not employ the first cache line to satisfy cache accesses when the lockout indicator is in the first state.

17. The device of claim 16, wherein the cache control module employs the first cache line to satisfy cache accesses when the lockout indicator is in the second state.

18. The device of claim 15, wherein the cache control module, when the lockout policy is the first policy, sets the lockout indicator for the first cache line to the second state in response to a software request.

19. The data processing device of claim 15, wherein the cache invalidation event comprises execution of an instruction to invalidate the cache at the processor unit.

20. A device of claim 15, further comprising determining the lockout policy based on information stored at a register.

* * * * *